US006176963B1

(12) United States Patent
Homrich

(10) Patent No.: US 6,176,963 B1
(45) Date of Patent: Jan. 23, 2001

(54) CLAMP SYSTEM

(76) Inventor: Dani Homrich, 1531 W. Hamlin Rd., Rochester Hills, MI (US) 48309

(*) Notice: Under 35 U.S.C. 154(b), the term of this patent shall be extended for 0 days.

(21) Appl. No.: 09/144,296

(22) Filed: Aug. 31, 1998

Related U.S. Application Data

(63) Continuation of application No. 08/969,392, filed on Nov. 13, 1997, now abandoned.

(51) Int. Cl.[7] ..................................................... B29C 65/00

(52) U.S. Cl. ........................... 156/304.1; 24/455; 24/570; 83/39; 83/44; 83/54; 156/60; 156/312; 156/349; 264/159

(58) Field of Search .......................... 156/60, 349, 304.1, 156/312; 83/44, 54, 39; 264/159; 24/570, 455

(56) References Cited

U.S. PATENT DOCUMENTS

| | | | | |
|---|---|---|---|---|
| 607,530 | | 7/1898 | Taylor . | |
| 1,406,439 | | 2/1922 | Boyler . | |
| 1,734,379 | * | 11/1929 | Hitchcock | 156/349 |
| 1,897,548 | * | 2/1933 | Butterworth | 156/304.1 |
| 2,021,609 | | 11/1935 | Pippert . | |
| 2,025,848 | | 12/1935 | Collis . | |
| 4,164,058 | * | 8/1979 | Barna | 24/570 |
| 4,617,849 | * | 10/1986 | Ligon | 83/54 |
| 4,747,496 | | 5/1988 | Rendine . | |
| 4,934,540 | | 6/1990 | Novak . | |
| 4,970,760 | * | 11/1990 | Hawkins | 24/455 |
| 5,188,637 | | 2/1993 | Wadsworth . | |
| 5,611,123 | | 3/1997 | Prizzi . | |

FOREIGN PATENT DOCUMENTS

| | | | | |
|---|---|---|---|---|
| 717914 | * | 11/1954 | (GB) | 156/299 |
| 5270188 | | 10/1993 | (JP) . | |
| 5-270188 | * | 10/1993 | (JP) | 24/455 |

* cited by examiner

*Primary Examiner*—John J. Gallagher
(74) *Attorney, Agent, or Firm*—Howard & Howard

(57) ABSTRACT

A C-shaped clamp cut from a PVC tube having a longitudinal axis and comprising a circular ring of a predetermined diameter and having side edges and a predetermined radial wall thickness extending through a predetermined width between the side edges and a slit cut across the width of the ring to define jaws on either side of the slit. A plurality of the circular clamps are utilized in a method for fabricating a counter top. Edge trims strips are adhesively laminated together on a shelf while held by clamps for curing and later adhesively secured to the periphery of a counter top panel, again held in place by clamps including corner clamps. In an another version, two panels are held in edge to edge contact by either abutments on the panels or by a stringer held in a bowed configuration by a combination of abutting clamps Handles are provided to facilitate manual opening of the clamps.

31 Claims, 6 Drawing Sheets

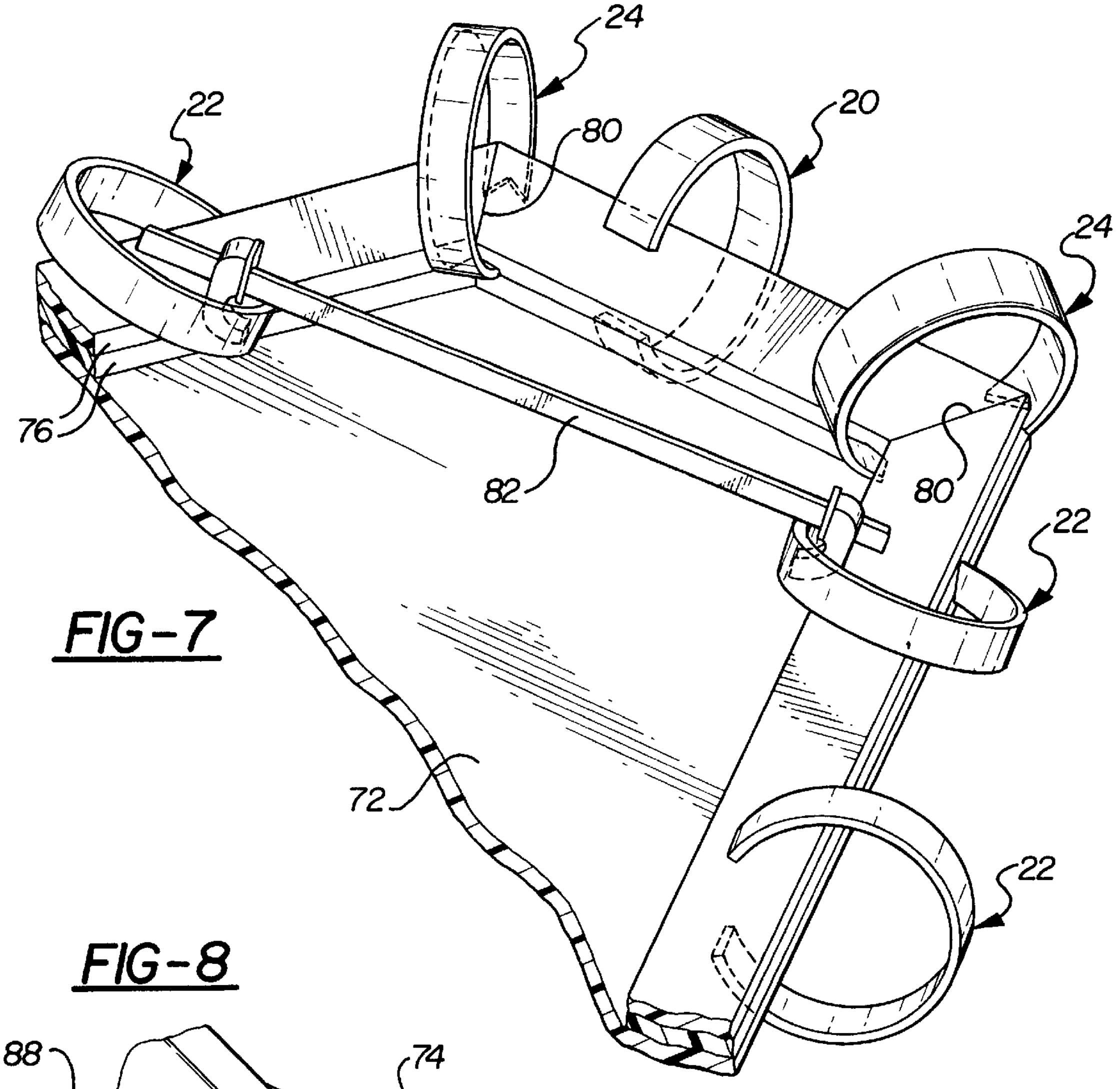
FIG-7
FIG-8
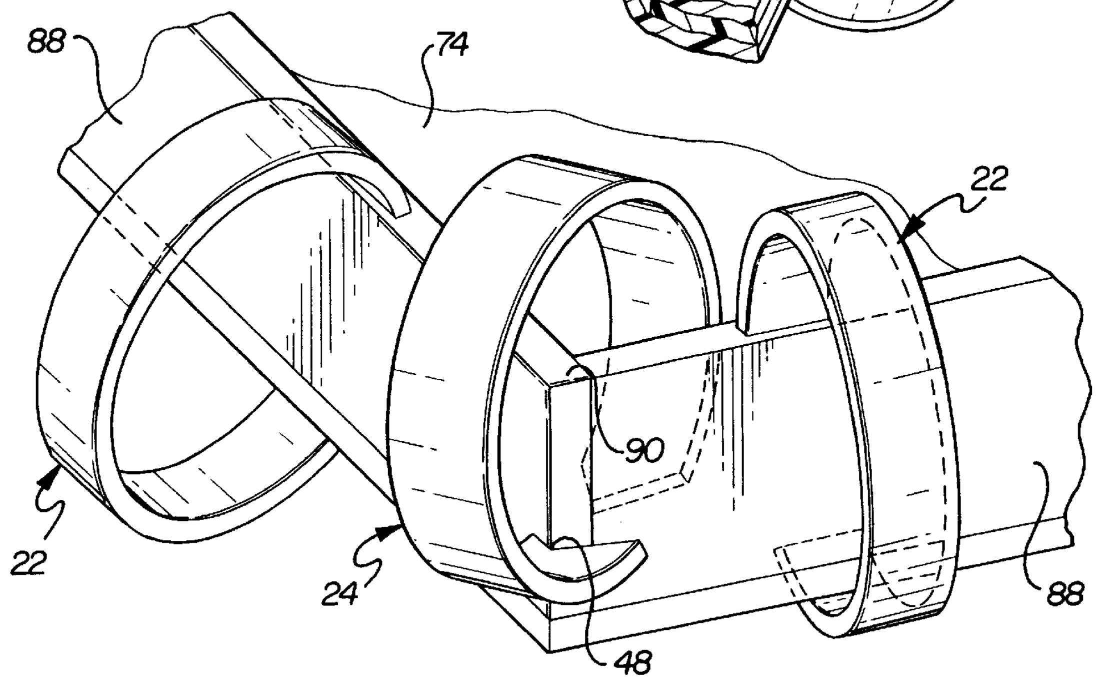

CLAMP SYSTEM

RELATED APPLICATIONS

This application is a continuation of U.S. Ser. No. 08/969,392 filed Nov. 13, 1997, now abandoned.

BACKGROUND OF THE INVENTION

1. Field of the Invention

The subject invention relates to a clamp and a method of fabricating counter tops uses the clamp.

2. Description of the Prior Art

Various clamp configurations are known to the prior art. The clamps are typically made from a process dedicated to making a clamp of a specific configuration, i.e., a well known C-clamp having a forged or cast metal frame defining one jaw and a second jaw threadedly supported by the other jaw. Clamps of a more simple configuration are known but are also made by special fabrication techniques. One example is a spring clamp for a collapsible tube wherein the clamp is made of metal and is elongated with a circular cross section having a mouth for engaging a toothpaste tube, or the like, and shown in U.S. Pat. No. 607,530 to Taylor. A similar clamp is shown in U.S. Pat. No. 1,406,439 to Boyler and U.S. Pat. No. 2,021,609 to Pippert. The U.S. Pat. No. 2,025,848 to Collis discloses a C-shaped clamp having radially extending handles for facilitating the opening of the clamp. A clip similar to one used to hold the trousers of a bicyclist against his leg is shown in U.S. Pat. No. 4,747,496 to Rendine to squeeze the side walls of a plastic bottle.

However, none of the clamps known to prior art are efficient for fabricating counter tops of synthetic stone. The craftsman is need of a simple yet effective clamp which is easily manipulated for fabricating counter tops.

SUMMARY OF THE INVENTION AND ADVANTAGES

The invention encompasses a method for making a clamp, the clamp per se, and a method of fabricating counter tops using the clamp.

The first is a method for making a clamp from a tube having a predetermined wall thickness extending circularly around a longitudinal axis comprising the steps of cutting the tube transversely to the longitudinal axis to define a ring having a predetermined width, and cutting a slit in the ring across the width thereof to define jaws of a C-shaped clamp.

Accordingly, there is produced a C-shaped clamp comprising a circular ring of a predetermined diameter and having side edges and a predetermined radial wall thickness extending through a predetermined width between the side edges, and a slit extending across the width of the ring to define jaws on either side of the slit.

The invention also includes a method for fabricating a counter top by clamping work pieces using a plurality of the circular clamps comprising the steps of opening the jaws to increase the opening of the slit, placing the jaws on opposite sides of a work piece, and releasing the jaws to engage and grip the work piece.

BRIEF DESCRIPTION OF THE DRAWINGS

Other advantages of the present invention will be readily appreciated as the same becomes better understood by reference to the following detailed description when considered in connection with the accompanying drawings wherein:

FIG. 7 is a fragmentary perspective view showing the fabrication of the trim stripes to a counter top with the clamp system of the subject invention;

FIG. 8 is a fragmentary perspective view showing the fabrication of the back splash plates to a counter top with the clamp system of the subject invention;

DETAILED DESCRIPTION OF THE PREFERRED EMBODIMENT

Figure 1:
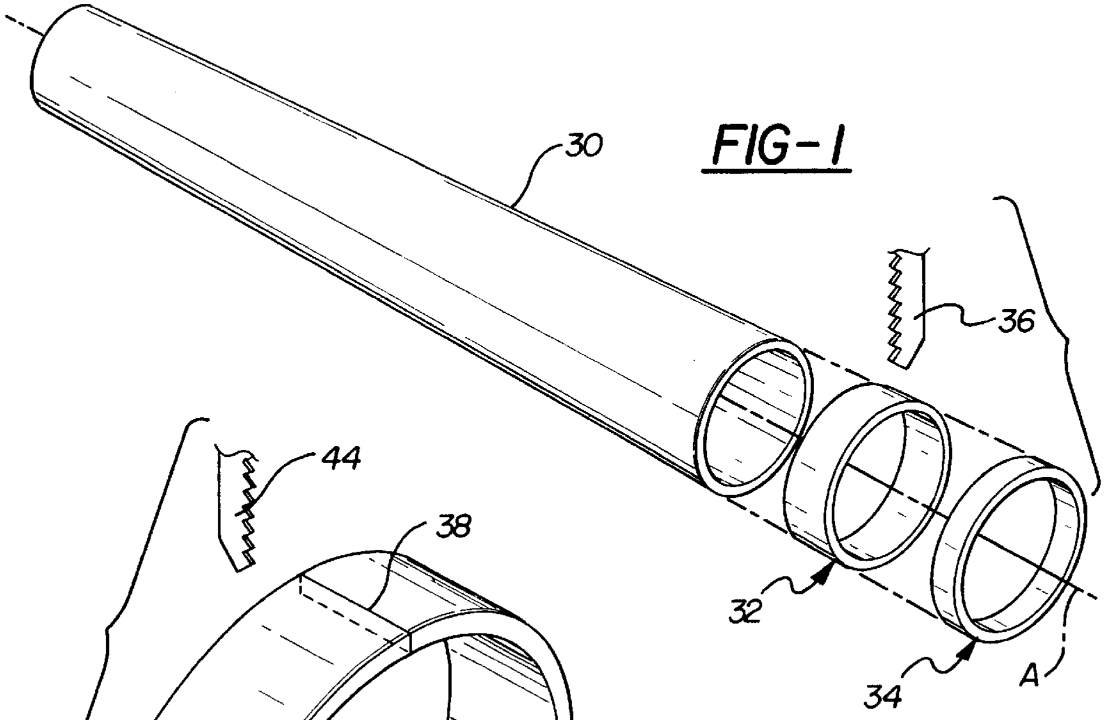
FIG. 1 is a perspective view of the first step in forming the clamp of the subject invention by cutting a ring from a plastic tube.
Figure 2:
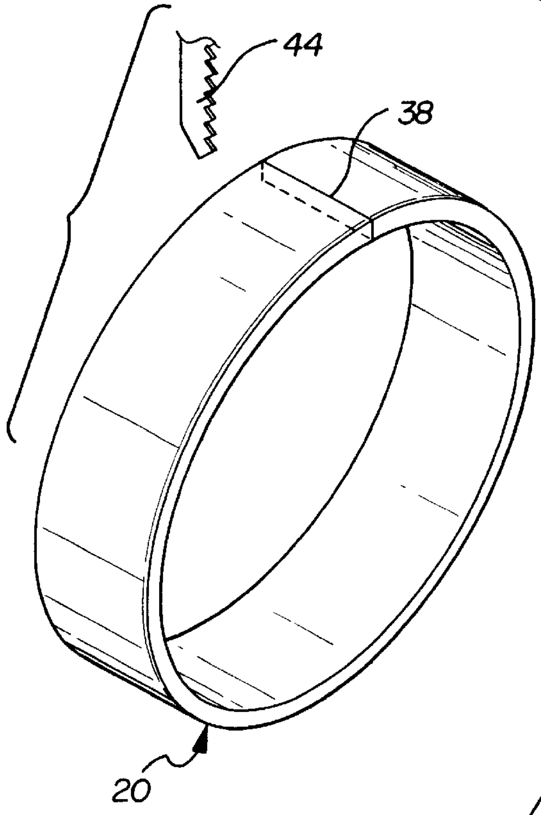
FIG. 2 is a perspective view showing the step of cutting the ring to form the clamp of the subject invention.
Figure 3:
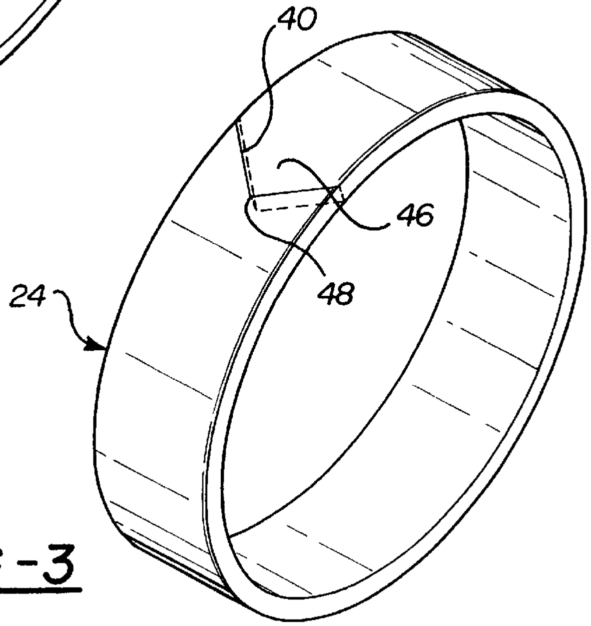
FIG. 3 is a perspective view showing an alternative cut to define a corner clamp.
Figure 4:
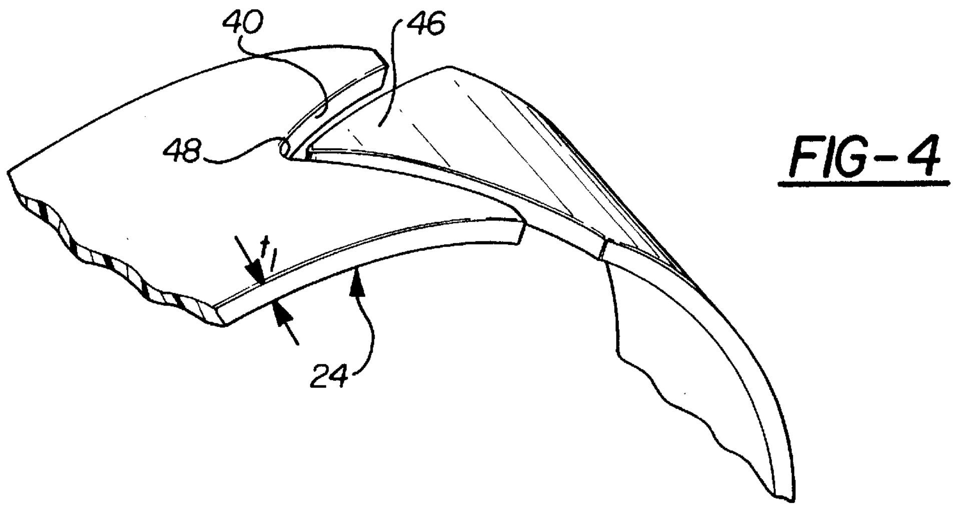
FIG. 4 is a fragmentary perspective view showing another alternative cut to define another corner clamp.
Figure 5:
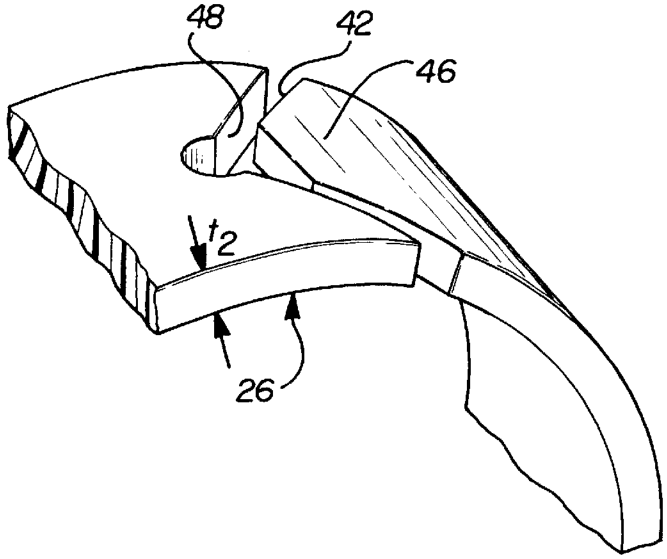
FIG. 5 is a fragmentary perspective view showing yet another alternative cut to define yet another corner clamp.

Referring to the Figures, wherein like numerals indicate like or corresponding parts throughout the several views, a C-shaped, i.e., a circular C, clamp made in accordance with the instant invention is generally indicated at 20, 22, 24, 26, 28 and 29, respectively. The invention includes a method for making a clamp 20, 22, 24, 26, 28 and 29 from an integral tube 30 having a predetermined wall thickness ($t_1$, $t_2$, . . . ) extending circularly around a longitudinal axis (A). The method includes the step of cutting the tube 30 transversely to the longitudinal axis (A) to define a unitary or integral ring 32 or 34 having a predetermined width, a wide width in the case of ring 32 and a narrow width in the case of the ring 34, but a width less than the diameter of the ring 32 or 34. The tube 30 consists of plastic and, more specifically, polyvinyl chloride (PVC), and is cut with a band saw 36 but can be cut with any appropriate instrument or laser. The other fundamental step is cutting a slit 38, 40 or 42 in the ring 32 or 34 across the width thereof to define jaws in the C-shaped clamp 20, 22, 24, 26, 28 and 29 on each side of the slit, and which jaws contact one another as shown in FIGS. 2 and 3. Again, the slit can be cut with a band saw 44, laser, or the equivalent. The cutting of the slit 40 or 42 is further defined as cutting a V-shaped slit to define one jaw as an male apex 46 and the other jaw as a female cavity 48. In the case of the slit 42, the tip of the male apex 46 is blunted and the point of the female recess has a round hole cut therein to allow clearance for joint adhesive and outside edge of material. As alluded to above, the cutting of the tube 30 includes cutting rings 32 and 34 of various different widths, the wide width of the clamps 20, 24 and 29 from the wide rings 32 or the narrow width of clamps 22 and 28 from the narrow rings 34. However, the cutting of rings 32 and 34 may be from tubes 30 of various different diameters, i.e., the large diameters of clamps 22, 24, 26 and 28 or the small diameter of clamp 29. Additionally, the tubes 30 from which the rings 32 and 34 are cut may have various different wall thicknesses, $t_1$, $t_2$, . . . The method also includes the step of forming a taper 50 across the width of the clamp 28 at one of the jaws and increasing in thickness from the slit therein. Each clamp is, therefore, an integral or homogeneous piece of plastic.

The method further includes attaching a pair of independent handles, each generally indicated at 52, on the clamp for opening the jaws by manual movement of the handles 52. Each of the handles 52, is and independent element and includes an arcuate section 54 engaging the width of the clamp between first and second ends with catches 56 disposed at the second end of the arcuate section 54 and extending around the edges of the clamp and an arm 58 extending from the first end of the arcuate section 54. The arcuate sections 54 have cutouts 59 therein to place the catches 56 on flexible fingers to facilitate the disposition of the catches 56 around the edges of the clamp. The arms 58 of the pair diverge from one another as the first ends of the arcuate sections 54 abut one another to act as a fulcrum for the arms 58. Accordingly, the handles 52 facilitate the opening the jaws to increase the opening of the slit for placing the jaws on opposite sides of a work piece and releasing the jaws to engage and grip the work piece.

A component of the invention, therefore, includes a C-shaped clamp 20, 22, 24, 26, 28 or 29 cut from a tube 30 having a longitudinal axis (A) and comprising a circular ring 32 or 34 of a predetermined diameter and having side edges and a predetermined radial wall thickness $t_1$, $t_2$, etc., extending through a predetermined width between the side edges, which width is less than the diameter of the circular ring 32 or 34, and a slit 38, 40 or 42 extending across the width of the ring 32 or 34 to define jaws on either side of the slit 38, 40 or 42. The clamps 20, 22, 24, 26, 28 and 29 may vary in size by varying in diameter, radial wall thickness $t_1$, $t_2$, . . . and/or width, but in each case the wall thickness $t_1$, $t_2$, . . . is constant both across the width and continuously about the clamp. The slit 38, 40 or 42 may be straight across the width 38, or V-shaped 40 or 42 to define one jaw as an male apex 46 and the other jaw as a female cavity 48 whereby the male jaw 46 of the clamp 24 or 26 may be disposed on the inside of a corner and the female jaw on the outside of the corner, which will described more fully hereinafter. In some instances, the clamp 28 includes a taper 50 across the width of the ring 32 or 34 at one of the jaws and which increases in thickness from the slit 38 therein. But in any case, the jaws have a thickness no greater than the remainder of the circumference of the clamp.

Another component to be employed in combination with the clamp of the subject invention is a stringer 60 or 62 having first and second ends with a hook 64 or 66 at the first end and an abutment 68 at the second end. In the case of the stringer 62 a reaction tab 70 is disposed on the top of the stringer 62 adjacent the abutment 68.

The invention provides a method for fabricating a counter top 72 or 74 by clamping work pieces by selecting from a plurality of these circular clamps 20, 22, 24, 26, 28 or 29 cut from one or more tubes 30 each having a predetermined wall thickness extending circularly around a longitudinal axis (A) with a slit 38, 40 or 42 cut across the width to define jaws of the C-shaped clamp 20, 22, 24, 26, 28 and 29. The method comprising the basic steps of opening the jaws from contact with one another to increase the opening of the slit 38, 40 or 42; placing the jaws on opposite sides of a work piece; and releasing the jaws to engage and grip the work piece.

Figure 6:
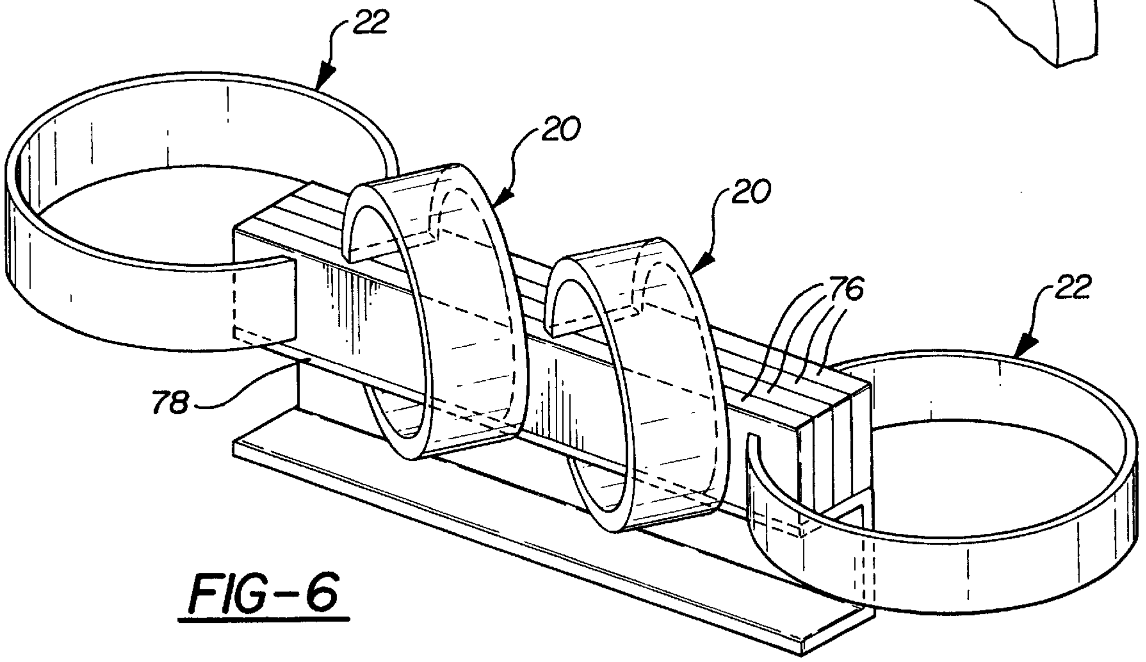
FIG. 6 is a perspective view showing the fabrication of trim stripes with the clamp system of the subject invention.

In the fabrication of a subassembly, the method encompasses the forming of a plurality of strips 76 having opposite faces extending between parallel edges, applying adhesive to at least one of the faces, sandwiching the faces of a plurality of the strips 76 together with the adhesive between the faces to define the work piece. As shown in FIG. 6, the strips 76 are paired in twos with each pair adhesively mated. One of the edges of the strips 76 is placed on a shelf 78, which is actually the upper ledge of a channel member. The method includes the steps of placing the jaws of a first plurality of clamps 22 against the strips 76 to hold the stripes 76 in the sandwiched relationship and placing the jaws of a second plurality of clamps 20 against one edge of the strips 76 and under the shelf 78 to hold the strips 76 against the shelf 78 for curing to define edge trim. The first plurality of clamps 22 are of a first diameter and the second plurality of clamps 20 are of a second diameter, i.e., are of different sizes.

The method includes forming a counter top panel 72 having a periphery. An adhesive is placed on one face of the edge trim, which comprises two strips 76 adhesively secured together. The edge trim is then placed about the periphery of the panel 72 with the adhesive in contact with the panel 72. The edge trim is held in position to cure the adhesive by placing one of the jaws of a plurality of the clamps 22 against the exposed face of the edge trim and the other jaw against the opposite side of the panel 72 to hold the edge trim against the panel 72. To place the edge trim around a corner of the panel 72, the method includes forming a miter joint 80 between two lengths of edge trim to define a corner having a small inside angle and a large outside angle, placing an adhesive between the two lengths at the miter joint 80, placing a corner clamp 24 having a male apex jaw 46 and a female cavity 48 at the corner with the male apex 46 engaging the two lengths in the inside angle and the female cavity 48 engaging the two lengths on the outside angle for curing the adhesive at the miter joint 80. In addition, as shown in FIG. 7, a pair of clamps 22 are placed in gripping engagement with opposite edges of the edge trim on opposite sides of the corner and a tension member 82 is placed between the pair of clamps 22 to bias the lengths of edge trim into the miter joint 80. The tension member 82 may take many forms but is shown as the customary adjustable slider-bar clamp.

Figure 9:
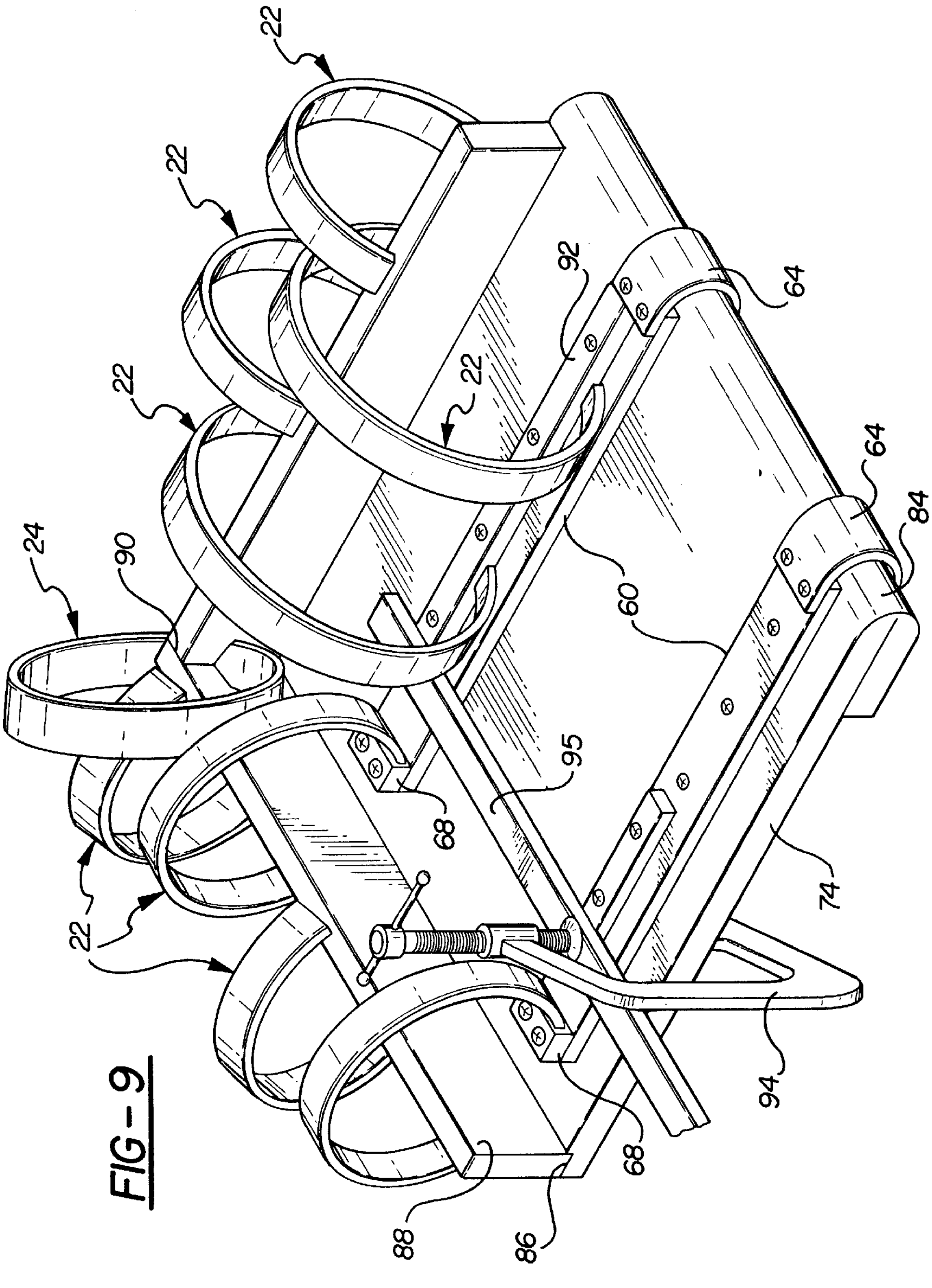
FIG. 9 is a perspective view showing the fabrication of the back splash plates to a counter top with the clamp system of the subject invention.

As shown in FIGS. 8 and 9, the method also includes forming a counter top panel 74 having top and bottom surfaces with a front lip 84, side and back margins and a splash plate recess 86 in the top surface along at least one of the margins. A first length of splash plate 88 having top and bottom edges with the bottom edge placed in the recess 86 with adhesive therebetween to define the work piece with the panel. An abutment 68 is disposed on the top surface of the panel adjacent the splash plate 88; more specifically, a stringer 60 is hooked at 64 over the front lip 84 and extends to and supports the abutment 68 adjacent the splash plate 88. One of the jaws of a clamp 22 is placed against the abutment 68 and the other jaw is placed against the splash plate 88 to hold the splash plate 88 in the recess 86 for curing of the adhesive therebetween. Therefore, the forces react between the splash plate 88 and the front lip 84 for biasing the splash plate 88 into the recess 86. To further hold the splash plate 88 into the recess 86, another group of clamps 22 have the jaws thereof placed between the bottom of the panel 74 and the top edge of the splash plate 88 to bias the splash plate 88 into the recess 86.

In order to place the counter top in a corner, a first length of splash plate 88 is placed along the back margin and a second length of splash plate 88 is placed along the side margin with the first and second lengths abutting at a corner 90. And an adhesive is placed between the two lengths of splash plate 88 at the corner 90. A corner clamp 24, having a male apex jaw 46 and a female cavity 48, is placed at the corner 90 with the male apex jaw 46 engaging the two lengths in the inside of the corner 90 and the female cavity 48 engaging the two lengths on the outside of the corner 90 for curing the adhesive at the corner 90. To hold the side splash plate 88 in position as shown in FIG. 9, another clamp 22 is disposed to engage the length of the stringer 60 with one jaw and the second or side splash plate 88 with the second jaw to bias the side splash plate 88 into the recess 86 along the side margin, the stringer 60 having a ledge 92 for abutting one jaw of a clamp. The method may be enhanced by holding the stringer 60 in engagement with the panel 74 with a normal clamp engaging a plank 95 extending across the stringers 60.

Figure 10:
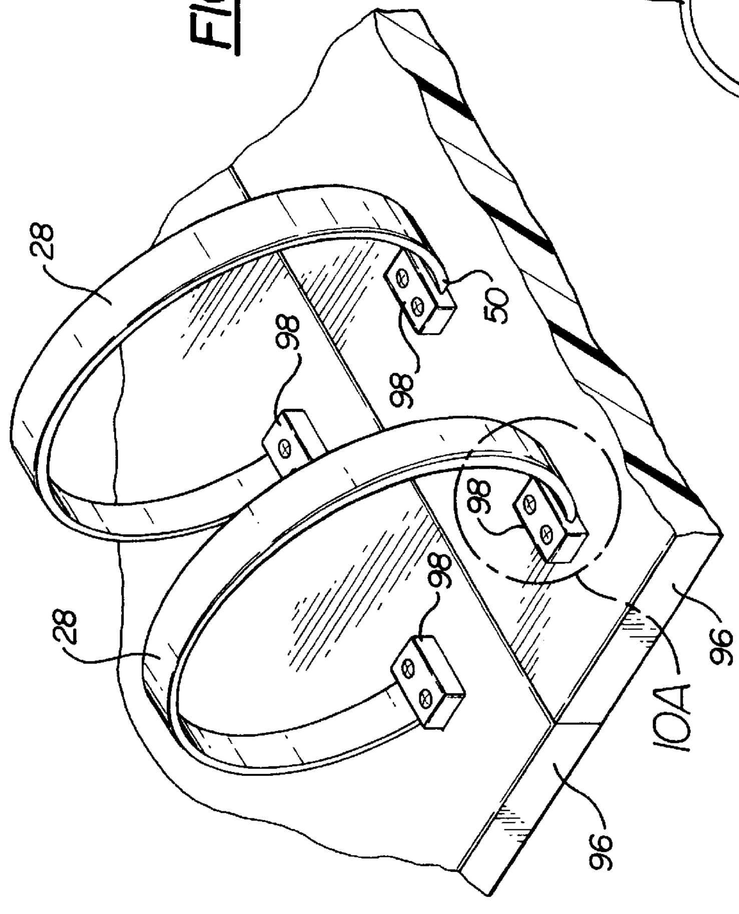
FIG. 10 is a fragmentary perspective view showing the fabrication of two pieces in edge to edge relationship with the clamp system of the subject invention.
Figure 11:
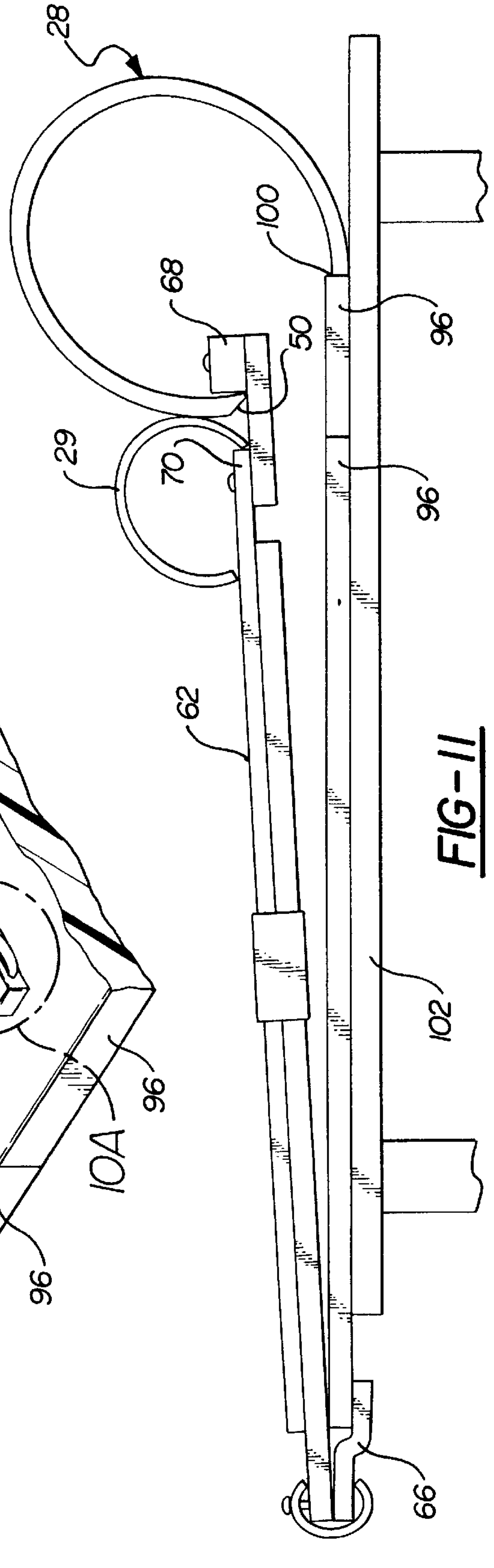
FIG. 11 is a side elevational view showing the fabrication of two pieces in edge to edge relationship with the clamp system of the subject invention.
Figure 10A:
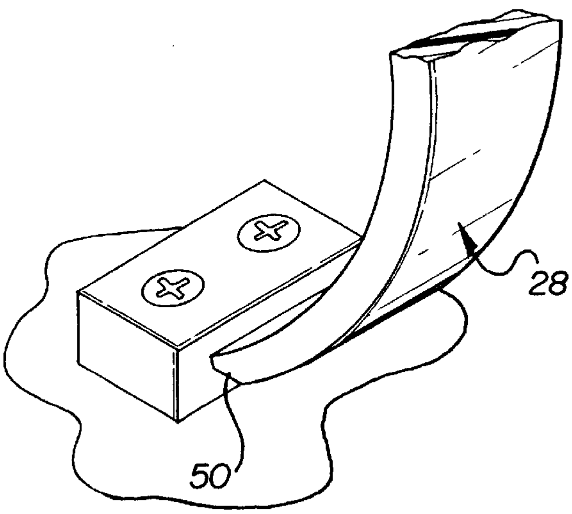
FIG. 10A is an enlarged fragmentary view of taken of the circle 10A of FIG. 10.
Figure 12:
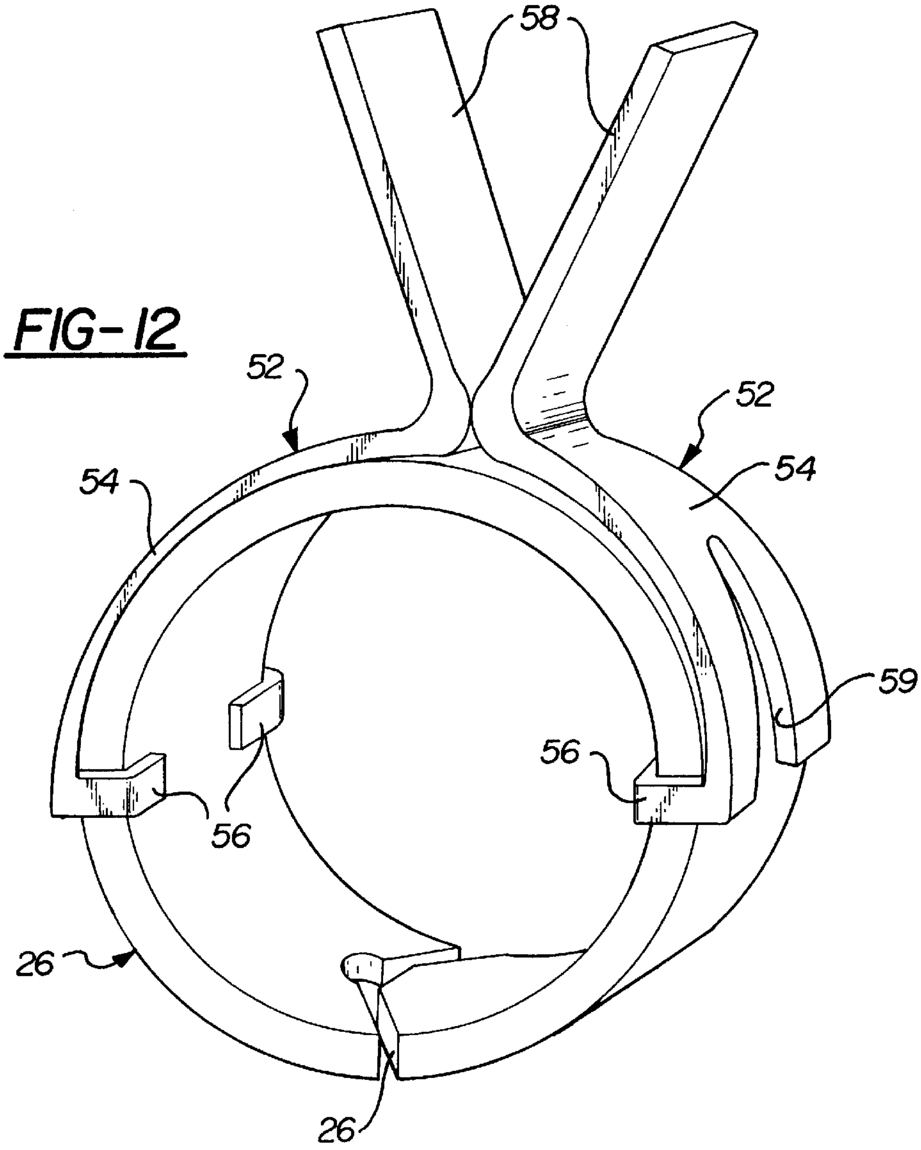
FIG. 12 is a perspective view of handles associated with the clamp system of the subject invention.

Yet another step in the method of fabrication includes placing two panels 96 in edge to edge contact with adhesive therebetween to define the work piece having a periphery and biasing the panels 96 into edge to edge contact with the clamp of the subject invention. A first species is illustrated in FIG. 10 wherein an abutment 98 is secured, by screws or adhesive, to each of the panels 96 adjacent the edge contact therebetween and one jaw of a clamp 28 is placed against one abutment 98 and the other jaw against the other abutment 98 to bias the panels 96 together. FIG. 11 illustrates a second species wherein a first end 66 of a stringer 62 is placed in engagement with the periphery of the panels 96 and the second end extends over the edge to edge contact between the panels 96. One jaw of a clamp 28 is placed in engagement at 100 with the opposite periphery of the panels 96 and the other jaw of the clamp in engagement with the abutment 68 at the second end of the stringer 62. A reaction tab 70 is placed on the stringer 62 adjacent the second end thereof and a second clamp 29 of smaller diameter than the first mentioned clamp 28 is placed on the stringer 62 with one jaw thereof against the reaction tab 70 to circumferentially abut the first clamp 28 and with the second jaw against the stringer 62 to force the first clamp 28 into an elliptical shape whereby the second end of the stringer 62 is held in spaced relationship to the edge to edge contact between the panels 96. The panels 96 are thereby held flat against the table 102 as the stringer 62 is bowed downwardly toward the table 102. Accordingly, the combination includes a second clamp 29 of smaller diameter than the first mentioned clamp 28 whereby the hook 66 at the first end of the stringer 62 may be hooked 66 over the periphery of one of two panels 96 to be adhesively secured together in edge to edge relationship with the second end of the stringer 62 extending over the edge to edge contact between the panels 96 as one jaw of the first clamp 28 is disposed in engagement 100 with the opposite periphery of the panels 96 and the other jaw of the first clamp 28 is disposed in engagement with the abutment 68 at the second end of the stringer 62 and a second clamp 29 of smaller diameter is disposed on the stringer 62 with one jaw thereof against the reaction tab 70 to circumferentially abut the first clamp 28 and with the second jaw against the stringer 62 to force the first clamp 28 into an elliptical shape so that the second end of the stringer 62 is held in spaced relationship to the edge to edge contact.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for making a plurality of clamps from a plurality of plastic tubes having various different diameters and each extending circularly around a longitudinal axis, said method comprising the steps of;

cutting each tube transversely to the longitudinal axis thereof to provide a plurality of rings having various different diameters cutting a slit in each ring across the width thereof to define jaws of a C-shaped clamp which contact one another.

2. A method as set forth in claim 1 wherein the cutting of the slit is further defined as cutting a V-shaped slit to define one jaw as an male apex and the other jaw as a female cavity whereby the male jaw of the clamp may be disposed on the inside of a corner and the female jaw on the outside of the corner.

3. A method as set forth in claim 1 including cutting rings of various different widths with each width being less than the diameter of the tube from which cut.

4. A method as set forth in claim 1 including cutting rings from tubes of various different wall thicknesses.

5. A method for making a clamp from a tube having a predetermined wall thickness extending circularly around a longitudinal axis, said method comprising the steps of:

cutting the tube transversely to the longitudinal axis to define a ring having a predetermined width; and cutting a slit in the ring across the width thereof to define jaws of a C-shaped claim which contact one another forming a taper across the width of the clamp at one of the jaws and increasing in thickness from the slit therein.

6. A method for making a clamp from a tube having a predetermined wall thickness extending circularly around a longitudinal axis, said method comprising the steps of;

cutting the tube transversely to the longitudinal axis to define a ring having a predetermined width; and cutting a slit in the ring across the width thereof to define jaws of a C-shaped claim which contact one another attaching a pair of independent handles on the clamp and diverging in opposite directions from one another for opening the jaws by manual movement of the handles.

7. A method for fabricating a counter top by clamping work pieces using a plurality of circular clamps cut from a plurality of tubes having various different diameters and each extending circularly around a longitudinal axis with a slit cut across the width, which width is less than the diameter of the ring in which disposed, to define jaws of the C-shaped clamps, said method comprising the steps of;

opening the jaws of a clamp of a first diameter to increase the opening of the slit, and placing the jaws on the opposite sides of a work piece and releasing the jaws to engage and grip the work piece, opening the jaws of a clamp of a second diameter different from the first diameter to increase the opening of the slit therein and placing the jaws on opposite sides of a work piece and releasing the jaws to engage and grip the work piece.

8. A method as set forth in claim 7 including forming a plurality of strips having opposite faces extending between edges, applying adhesive to at least one of the faces, sandwiching the faces of a plurality of the strips together with the adhesive between the faces to define the work piece, placing one of the edges of the strips on a shelf, placing the jaws of a first plurality of clamps against the strips to hold the strips in the sandwiched relationship, placing the jaws of a second plurality of clamps against one edge of the strips and under the shelf to hold the strips against the shelf for curing to define edge trim.

9. A method as set forth in claim 8 including forming a counter top panel having a periphery, placing adhesive on one face of the edge trim, placing the edge trim about the periphery of the panel with the adhesive in contact with the panel, and placing one of the jaws of a plurality of the clamps against the exposed face of the edge trim and the other jaw against the opposite side of the panel to hold the edge trim against the panel for curing.

10. A method as set forth in claim 9 including forming a miter joint between two lengths of edge trim to define a corner having a small inside angle and a large outside angle, placing an adhesive between the two lengths at the miter joint, placing a corner clamp having a male apex jaw and a female cavity at the corner with the male apex jaw engaging the two lengths in the inside angle and the female cavity engaging the two lengths on the outside angle for curing the adhesive at the miter joint.

11. A method as set forth in claim 10 including placing a pair of clamps in gripping engagement with opposite edges of the edge trim on opposite sides of the miter joint, and placing a tension member between the pair of clamps to bias the lengths of edge trim into the miter joint.

12. A method as set forth in claim 7 including forming a counter top panel having top and bottom surfaces with a front lip, side and back margins and a splash plate recess in the top surface along at least one of the margins, disposing a first length of splash plate having top and bottom edges with the bottom edge in the recess with adhesive therebetween to define the work piece with the panel, disposing an abutment on the top surface of the panel adjacent the splash plate, disposing one of the jaws of the clamp against the abutment and the other jaw against the splash plate to hold the splash plate in the recess for curing of the adhesive therebetween.

13. A method as set forth in claim 12 including placing a stringer hooked over the front lip and extending to and supporting the abutment adjacent the splash plate whereby the forces react between the splash plate and the front lip for biasing the splash plate into the recess.

14. A method as set forth in claim 13 including placing the jaws of a second clamp between the bottom of the panel and the top edge of the splash plate to bias the splash plate into the recess.

15. A method as set forth in claim 14 including placing a first length of splash plate along the back margin and a second length of splash plate along the side margin with the first and second lengths abutting at a corner.

16. A method as set forth in claim 15 placing an adhesive between the two lengths at the corner, placing a corner clamp having a male apex jaw and a female cavity at the corner with the male apex jaw engaging the two lengths in the inside of the corner and the female cavity engaging the two lengths on the outside of the corner for curing the adhesive at the corner.

17. A method as set forth in claim 15 placing the stringer to bias the first length into the recess along the back margin and disposing a second clamp to engage the length of the stringer with one jaw and the second splash plate with the second jaw to bias the second splash plate into the recess along the side margin.

18. A method as set forth in claim 16 including holding the stringer in engagement with the panel.

19. A method as set forth in claim 7 including placing two panels in edge to edge contact with adhesive therebetween to define the work piece having a periphery and biasing the panels into edge to edge contact with the clamp.

20. A method as set forth in claim 19 including securing an abutment to each of the panels adjacent the edge contact therebetween, placing one jaw of the clamp against one abutment and the other jaw against the other abutment to bias the panels together.

21. A method as set forth in claim 19 including placing a first end of a stringer in engagement with the periphery of the panels and the second end extending over the edge to edge contact, placing one jaw of the clamp in engagement with the opposite periphery of the panels and the other jaw of the clamp in engagement with the second end of the stringer.

22. A method as set forth in claim 21 including placing a reaction tab on the stringer adjacent the second end thereof, placing a second clamp of smaller diameter than the first mentioned clamp on the stringer with one jaw thereof against the reaction tab to circumferentially abut the first clamp and with the second jaw against the stringer to force the first clamp into an elliptical shape whereby the second end of the stringer is held in spaced relationship to the edge to edge contact.

23. A method as set forth in claim 7 including attaching a pair of handles on the clamp for opening the jaws by manual movement of the handles.

24. A plurality of C-shaped clamps cut from plastic tubes of various different diameters and each having a longitudinal axis, said clamps comprising;

a plurality of circular rings each of a predetermined diameter and having side edges and a predetermined width between said side edges, said width of each ring being less than said predetermined diameter of said each ring, and a slit extending across the width of each ring to define jaws in contact with one another on either side of the slit, each said rings having a predetermined diameter different than said predetermined diameter of the remaining rings.

25. The invention as set forth in claim 24 wherein each of said rings has a predetermined width different than said predetermined width of the remaining rings.

26. The invention as set forth in claim 24 wherein each of said rings has a predetermined wall thickness different than said predetermined wall thickness of the remaining rings.

27. A C-shaped clamp cut from a tube having a longitudinal axis; said clamp comprising:

a circular ring of a predetermined diameter and having side edges and a predetermined width between said side edges, said width being less than said predetermined diameter of said ring, and a slit extending across the width of the ring to define jaws in contact with one another on either side of the slit a taper across the width of the slit at one of said jaws and increasing in thickness from the slit therein.

28. A C-shaped clamp cut from a tube having a longitudinal axis, said clamp comprising;

a circular ring of a predetermined diameter and having side edges and a predetermined width between said side edges, said width being less than said predetermined diameter of said ring, and a slit extending across the width of the ring to define jaws in contact with one another on either side of the slit, a pair of handles which are independent of and attached to the circumference of the clamp for opening the slit therein, each of said handles including an arcuate section engaging the width of the clamp between first and second ends, catches disposed at said second end of said arcuate section and extending around the edges of the clamp, and an arm extending from said first end of said arcuate section, said arms of said pair diverging from one another, said first ends of said arcuates sections abutting one another to act as a fulcrum of said arms.

29. A clamp as set forth in claim 24 in combination with an stringer having first and second ends, a hook at said first end and an abutment at said second end.

30. A clamp as set forth in claim 29 including a reaction tab on said stringer adjacent said abutment.

31. A combination as set forth in claim 30 including a second clamp of smaller diameter than said first mentioned clamp whereby said first end of said stringer may be hooked over the periphery of one of two panels to be adhesively secured together in edge to edge relationship with the second end of said stringer extending over the edge to edge contact as one jaw of the first clamp is disposed in engagement with the opposite periphery of the panels and the other jaw of the first clamp is disposed in engagement with the second end of the stringer and said second clamp of smaller diameter is disposed on the stringer with one jaw thereof against the reaction tab to circumferentially abut the first clamp and with the second jaw against the stringer to force the first clamp into an elliptical shape so that the second end of the stringer is held in spaced relationship to the edge to edge contact.

* * * * *